(12) United States Patent
Clark

(10) Patent No.: US 9,840,312 B1
(45) Date of Patent: Dec. 12, 2017

(54) INTEGRATED DISPLAY FOR A TROLLING MOTOR

(71) Applicant: NAVICO HOLDING AS, Egersund (NO)

(72) Inventor: Jeremiah Clark, Tulsa, OK (US)

(73) Assignee: NAVICO HOLDING AS, Egersund (NO)

( * ) Notice: Subject to any disclaimer, the term of this patent is extended or adjusted under 35 U.S.C. 154(b) by 29 days.

(21) Appl. No.: 15/182,154

(22) Filed: Jun. 14, 2016

(51) Int. Cl.
| | |
|---|---|
| *B63B 49/00* | (2006.01) |
| *G01S 15/96* | (2006.01) |
| *G01S 7/62* | (2006.01) |
| *G01S 15/89* | (2006.01) |
| *B63H 20/00* | (2006.01) |
| *G05D 1/02* | (2006.01) |
| *G01C 21/20* | (2006.01) |
| *G06F 3/0484* | (2013.01) |
| *G06F 3/0488* | (2013.01) |
| *G06F 3/023* | (2006.01) |
| *G06T 11/20* | (2006.01) |

(Continued)

(52) U.S. Cl.
CPC ........... *B63B 49/00* (2013.01); *B63H 20/007* (2013.01); *G01C 21/20* (2013.01); *G01S 7/6272* (2013.01); *G01S 15/89* (2013.01); *G01S 15/96* (2013.01); *G05D 1/0206* (2013.01); *G06F 3/023* (2013.01); *G06F 3/0488* (2013.01); *G06F 3/04845* (2013.01); *G06T 11/206* (2013.01); *G06T 11/60* (2013.01); *B63H 21/21* (2013.01); *G01C 21/00* (2013.01); *G05D 1/02* (2013.01); *G06T 2200/24* (2013.01)

(58) Field of Classification Search
CPC ........ B63H 21/21; B63H 20/10; B63H 25/42; B63H 20/08; B63H 20/007; G01C 21/00; G01C 21/20; G05D 1/02; G05D 3/00; G05D 1/0206; G06F 17/00; G06F 3/023; B63B 49/00; G01S 15/96; G01S 7/6272; G01S 15/89
See application file for complete search history.

(56) References Cited

U.S. PATENT DOCUMENTS

| | | | | |
|---|---|---|---|---|
| 6,160,764 A | * | 12/2000 | Powell | B63B 49/00 367/173 |
| 6,325,684 B1 | * | 12/2001 | Knight | B63H 20/007 114/144 RE |

(Continued)

OTHER PUBLICATIONS

Haswing Foot Pedal Controller for Cayman Trolling Motor website visited Jul. 1, 2016 http://www.aquosinflatableboat.com/goods.php?id=102.

(Continued)

*Primary Examiner* — Behrang Badii
(74) *Attorney, Agent, or Firm* — Nelson Mullins Riley & Scarborough LLP

(57) ABSTRACT

Trolling motor assemblies with an integrated screen and/or user interface are provided herein. For example, the screen is integrated in the main housing or a foot pedal housing of the trolling motor assembly and accessible/visible by a user while the trolling motor is deployed. Such an assembly provides an easy-to-use and compact assembly that provides useful marine features for the user right at the trolling motor, thereby saving space and allowing the user to receive all pertinent information at their current position on the watercraft.

12 Claims, 9 Drawing Sheets

(51) Int. Cl.
*G06T 11/60* (2006.01)
*G01C 21/00* (2006.01)
*B63H 21/21* (2006.01)

(56) References Cited

U.S. PATENT DOCUMENTS

2012/0015566 A1* 1/2012 Salmon .................. B63H 21/21
                                                         440/1
2012/0232719 A1* 9/2012 Salmon ................ G05D 1/0206
                                                         701/2

OTHER PUBLICATIONS i-Pilot Remote for Trolling Motors website visited Jul. 1, 2016 http:/www.minnkotamotors.com/Products/i-PILOT-REMOTE/.

* cited by examiner

INTEGRATED DISPLAY FOR A TROLLING MOTOR

FIELD OF THE INVENTION

Embodiments of the present invention relate generally to trolling motor assemblies and, more particularly, to systems, assemblies, and associated methods for providing a trolling motor assembly with an integrated display.

BACKGROUND OF THE INVENTION

Trolling motors are often used during fishing or other marine activities. The trolling motors attach to the watercraft and propel the watercraft along a body of water. For example, trolling motors may provide secondary propulsion or precision maneuvering that can be ideal for fishing activities. The trolling motors, however, may also be utilized for the main propulsion system of watercraft. Further, there are many helpful marine data features, such as navigation, sonar, motor/vessel gauges, among others, that can be used by operators or users of the watercraft with a trolling motor. Applicant has developed systems, assemblies, and methods detailed herein to improve capabilities of trolling motors.

BRIEF SUMMARY OF THE INVENTION

Depending on the desired activity, an operator or user of the watercraft with the trolling motor may wish to utilize known helpful marine data or features (e.g., sonar, navigation, vessel gauges, motor gauges, etc.). In this regard, the user may want to view a screen that shows images of the corresponding marine data or provide input to a corresponding user interface.

Current systems, however, require a separate screen and/or user interface to facilitate such interaction. This requires separate equipment, a separate power source, and a separate space within the watercraft. In this regard, trolling motors are sometimes attached to a watercraft in positions that align with where the fisherman fishes from the watercraft—often being disposed away from the main control center and user interface of the watercraft. Additionally, in some cases, the watercraft may be relatively small, thereby providing limited space for the extra equipment. Thus, embodiments of the present invention seek to provide trolling motor assemblies with an integrated screen and/or user interface. In particular, in some embodiments, the screen is integrated in either the main housing or a foot pedal housing of the trolling motor assembly and accessible/visible by a user while the trolling motor is deployed. This provides an easy-to-use and compact assembly that provides all necessary features for the user at their fingertips—saving space and allowing the user to receive all pertinent information at their current position on the watercraft.

An example embodiment of the present invention provides a trolling motor assembly configured for attachment to a watercraft. The trolling motor assembly comprises a shaft defining a first end and a second end. The trolling motor assembly further comprises a trolling motor at least partially contained within a trolling motor housing. The trolling motor housing is attached to the second end of the shaft. When the trolling motor assembly is attached to the watercraft and the trolling motor housing is submerged in a body of water, the trolling motor is configured to propel the watercraft to travel along the body of water. The trolling motor assembly further comprises a main housing connected to the shaft proximate the first end of the shaft. The main housing is configured to be positioned out of the body of water when the trolling motor assembly is attached to the watercraft and the trolling motor housing is submerged in the body of water. The trolling motor assembly further comprises at least one of a position sensor configured to determine the location of the watercraft or a sonar transducer assembly configured to gather sonar data from an underwater environment relative to the watercraft. The trolling motor assembly further comprises a screen configured to display marine data, one or more processors, and a memory including computer program code. The computer program code is configured to cause the one or more processors to receive marine data from the at least one position sensor or sonar transducer assembly. The computer program code is further configured to cause the one or more processors to process the received marine data to generate an image including at least one of a chart with the location of the watercraft or a sonar image based on the gathered sonar data and cause the screen to display the image. The screen is integrated with the main housing and configured to display the image including the at least one chart or sonar image.

In some embodiments, the trolling motor assembly further comprises a user interface including the screen. The user interface is integrated with the main housing and may be configured to display the image and receive user input. The computer program code may be further configured to cause the one or more processors to receive the user input from the user interface, process the received user input to generate a modified image based on the user input, and cause the screen to display the modified image. In some further embodiments, the screen may be a touch screen and the user input may be directed to the touch screen. Additionally or alternatively, the user interface may define one or more buttons integrated with the main housing.

In some embodiments, the one or more processors and the memory are contained within the main housing.

In some embodiments, the trolling motor assembly further comprises a navigation system that includes the at least one position sensor. The computer program code may be further configured to cause the one or more processors to generate at least one of a waypoint distinct from the location of the watercraft or a route associated with the location of the watercraft. The computer program code may be further configured to cause the one or more processors to cause the screen to display one or more images including the at least one waypoint or route. In some embodiments, the trolling motor assembly further comprises an autopilot. The autopilot may be configured to operate the trolling motor to propel the watercraft to the waypoint or along the route.

In some embodiments, the at least one sonar transducer assembly is contained within the trolling motor housing and configured to gather the sonar data from at least a portion of the underwater environment around the trolling motor housing.

In some embodiments, the computer program code is further configured to cause the one or more processors to electrically control the trolling motor. In some embodiments, the trolling motor assembly further comprises a power source configured to provide power to the screen and to enable electrical control of the trolling motor.

Another example embodiment of the present invention provides a trolling motor assembly configured for attachment to a watercraft. The trolling motor assembly comprises a shaft defining a first end and a second end. The trolling motor assembly further comprises a trolling motor at least partially contained within a trolling motor housing. The trolling motor housing is attached to the second end of the shaft. When the trolling motor assembly is attached to the watercraft and the trolling motor housing is submerged in a body of water, the trolling motor is configured to propel the watercraft to travel along the body of water. The trolling motor assembly further comprises a main housing connected to the shaft proximate the first end of the shaft. The trolling motor assembly further comprises a foot pedal at least partially contained within a foot pedal housing and electrically connected to the trolling motor. The foot pedal is configured to control operation of the trolling motor. The trolling motor assembly further comprises at least one of a position sensor configured to determine the location of the watercraft or a sonar transducer assembly configured to gather sonar data from an underwater environment relative to the watercraft. The trolling motor assembly further comprises a screen configured to display marine data, one or more processors, and a memory including computer program code. The computer program code is configured to cause the one or more processors to receive marine data from the at least one position sensor or sonar transducer assembly. The computer program code is further configured to cause the one or more processors to process the received marine data to generate an image including at least one of a chart with the location of the watercraft or a sonar image based on the gathered sonar data. The computer program code is further configured to cause the one or more processors to cause the screen to display the image. The screen is integrated with the foot pedal housing and configured to display the image including the at least one chart or sonar image.

Example apparatuses, assemblies, systems, and methods of the present invention may also include additional embodiments as described herein, such as described above with respect to the first example assembly.

A further example embodiment of the present invention provides a method of manufacturing a trolling motor assembly. The method includes providing a shaft defining a first end and a second end. The method further includes assembling a trolling motor housing to at least partially contain a trolling motor. The trolling motor housing is configured to connect to the second end of the shaft. When the trolling motor assembly is attached to a watercraft and the trolling motor housing is submerged in a body of water, the trolling motor is configured to propel the watercraft to travel along the body of water. The method further includes assembling a main housing. The main housing is configured to the shaft proximate the first end of the shaft. The main housing is configured to be positioned out of the body of water when the trolling motor assembly is attached to the watercraft and the trolling motor housing is submerged in the body of water. The main housing contains at least one of a position sensor configured to determine the location of the watercraft or a sonar signal processor configured to gather sonar data from an underwater environment relative to the watercraft. The main housing further contains a screen configured to display marine data, one or more processors, and a memory including computer program code stored thereon. The computer program code is configured, when executed, to cause the one or more processors to receive marine data from the at least one position sensor or sonar transducer assembly. The computer program code is further configured, when executed, to cause the one or more processors to process the received marine data to generate an image including at least one of a chart with the location of the watercraft or a sonar image based on the gathered sonar data. The computer program code is further configured, when executed, to cause the one or more processors to cause the screen to display the image. The screen is integrated with the main housing and configured to display the image including the at least one chart or sonar image.

In some embodiments, the main housing further contains a user interface including the screen. The user interface is integrated with the main housing and configured to display the image and receive user input. Additionally, the computer program code is further configured, when executed, to cause the one or more processors to receive the user input from the user interface, process the received user input to generate a modified image based on the user input, and cause the screen to display the modified image.

In yet another example embodiment of the present invention, another method of manufacturing a trolling motor is provided. The method includes providing a shaft defining a first end and a second end. The method further includes assembling a trolling motor housing to at least partially contain a trolling motor. The trolling motor housing is configured to connect to the second end of the shaft. When the trolling motor assembly is attached to a watercraft and the trolling motor housing is submerged in a body of water, the trolling motor is configured to propel the watercraft to travel along the body of water. The method further includes assembling a main housing. The main housing is configured to the shaft proximate the first end of the shaft. The main housing is configured to be positioned out of the body of water when the trolling motor assembly is attached to the watercraft and the trolling motor housing is submerged in the body of water. The main housing contains at least one of a position sensor configured to determine the location of the watercraft or a sonar signal processor configured to gather sonar data from an underwater environment relative to the watercraft. The method further includes assembling a foot pedal housing. The foot pedal housing contains a screen configured to display marine data. Depending on the embodiment, at least one of the main housing or the foot pedal housing may further contain one or more processors and a memory including computer program code stored thereon. The computer program code is configured, when executed, to cause the one or more processors to receive marine data from the at least one position sensor or sonar transducer assembly. The computer program code is further configured, when executed, to cause the one or more processors to process the received marine data to generate an image including at least one of a chart with the location of the watercraft or a sonar image based on the gathered sonar data. The computer program code is further configured, when executed, to cause the one or more processors to cause the screen to display the image. The screen is integrated with the foot pedal housing and configured to display the image including the at least one chart or sonar image.

Example methods of manufacturing of the present invention may include additional embodiments as described herein, such as described above with respect to the first example method.

BRIEF DESCRIPTION OF THE DRAWINGS

Figure 1:
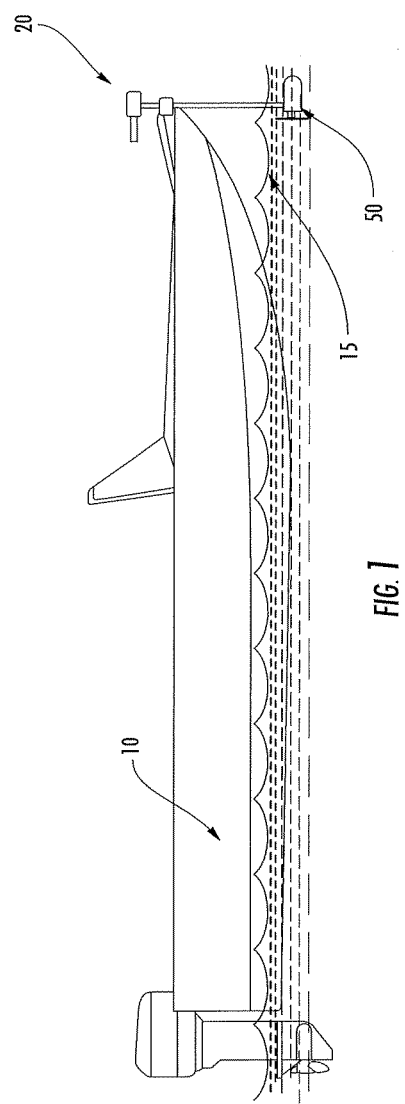
Figure 2:
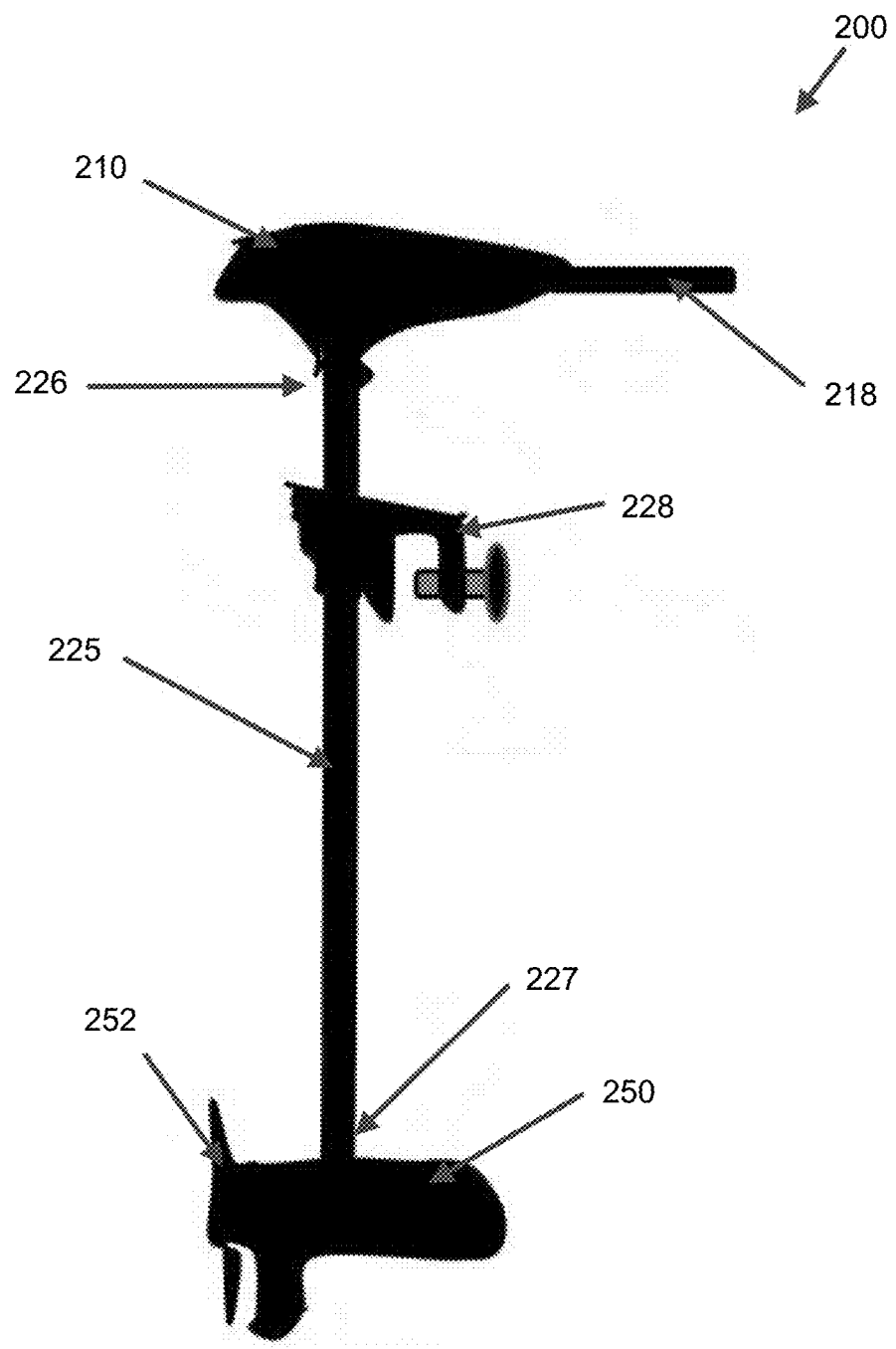
Figure 3:
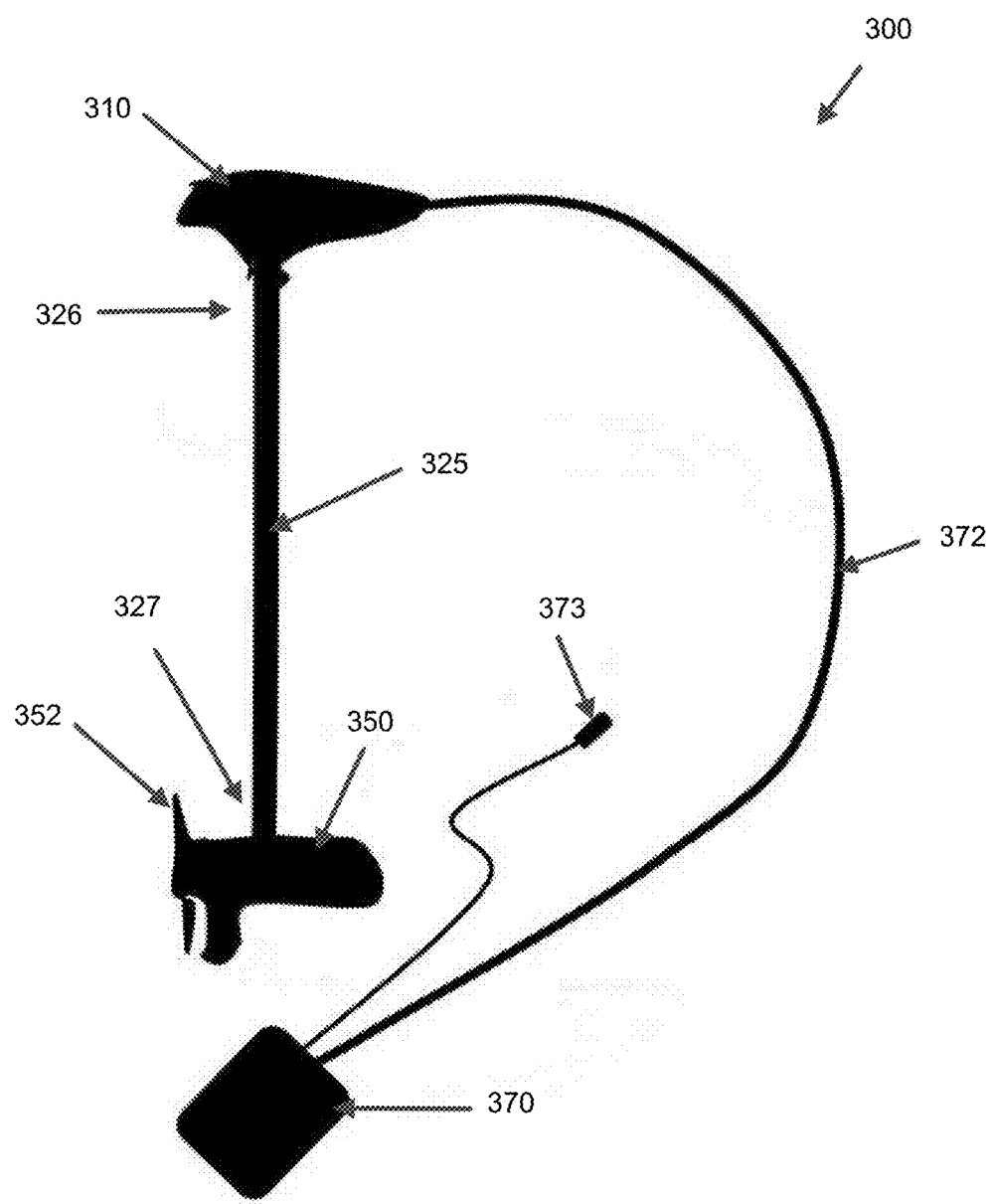
Figure 4:
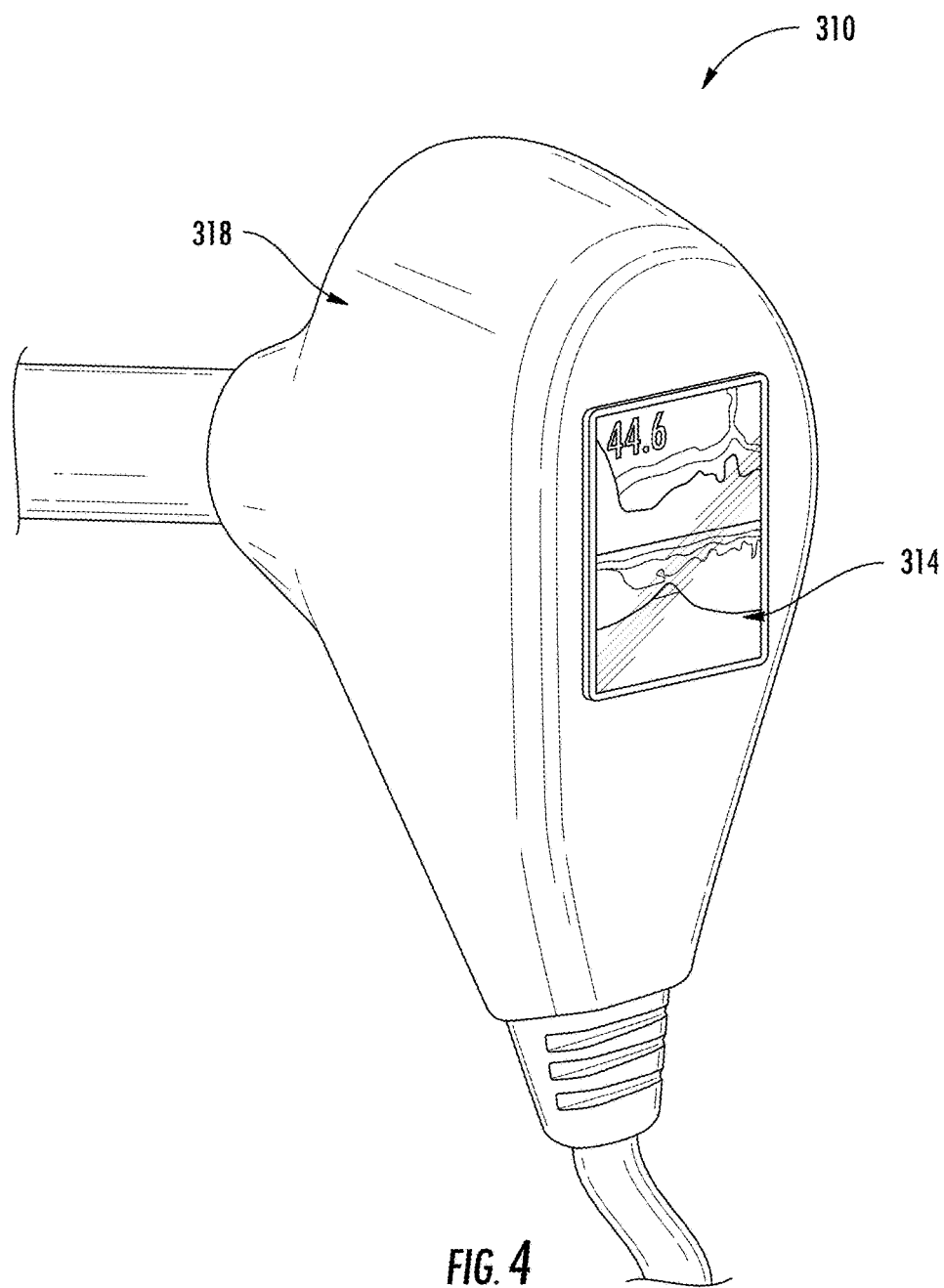
Figure 5:
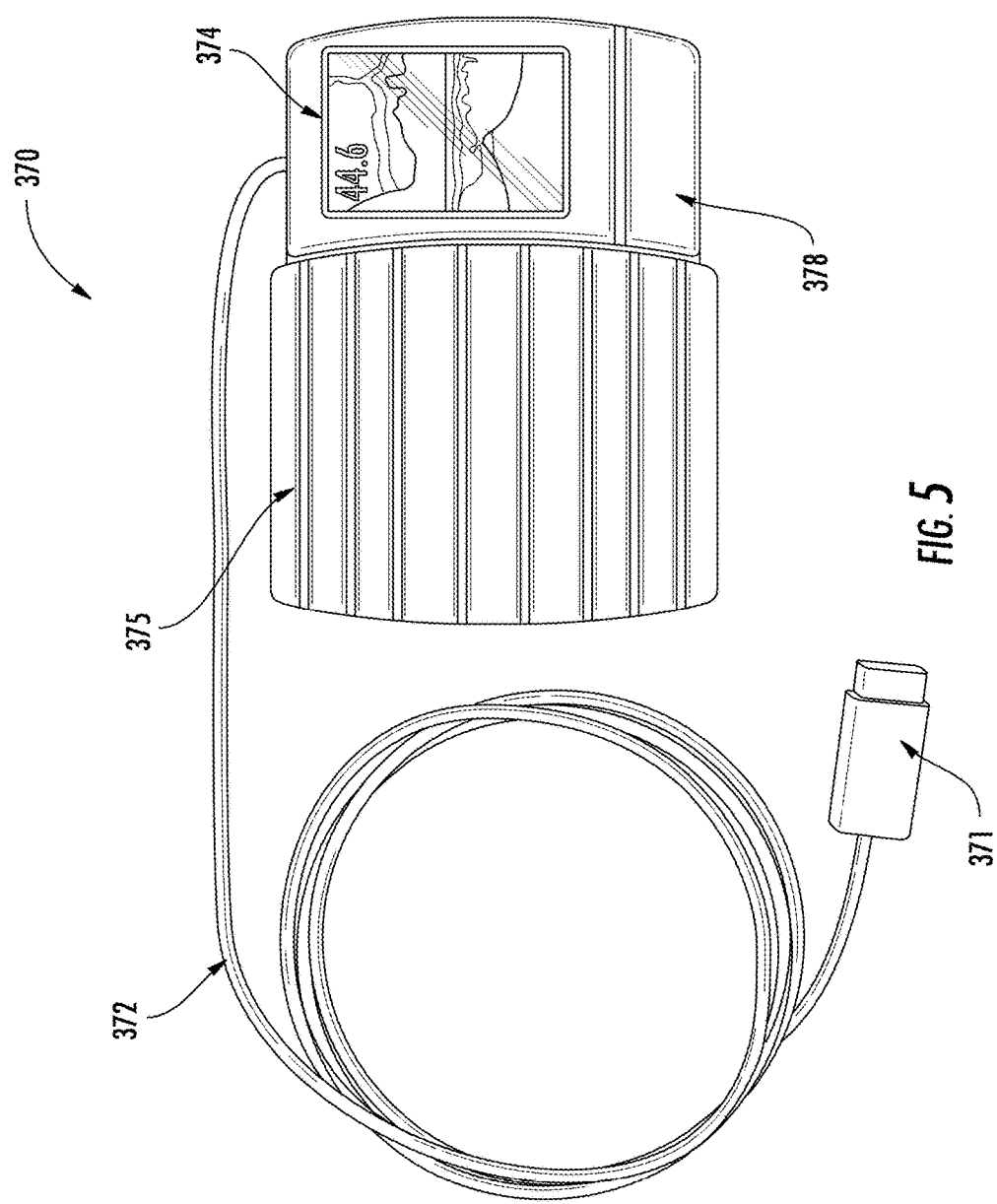
Figure 6:
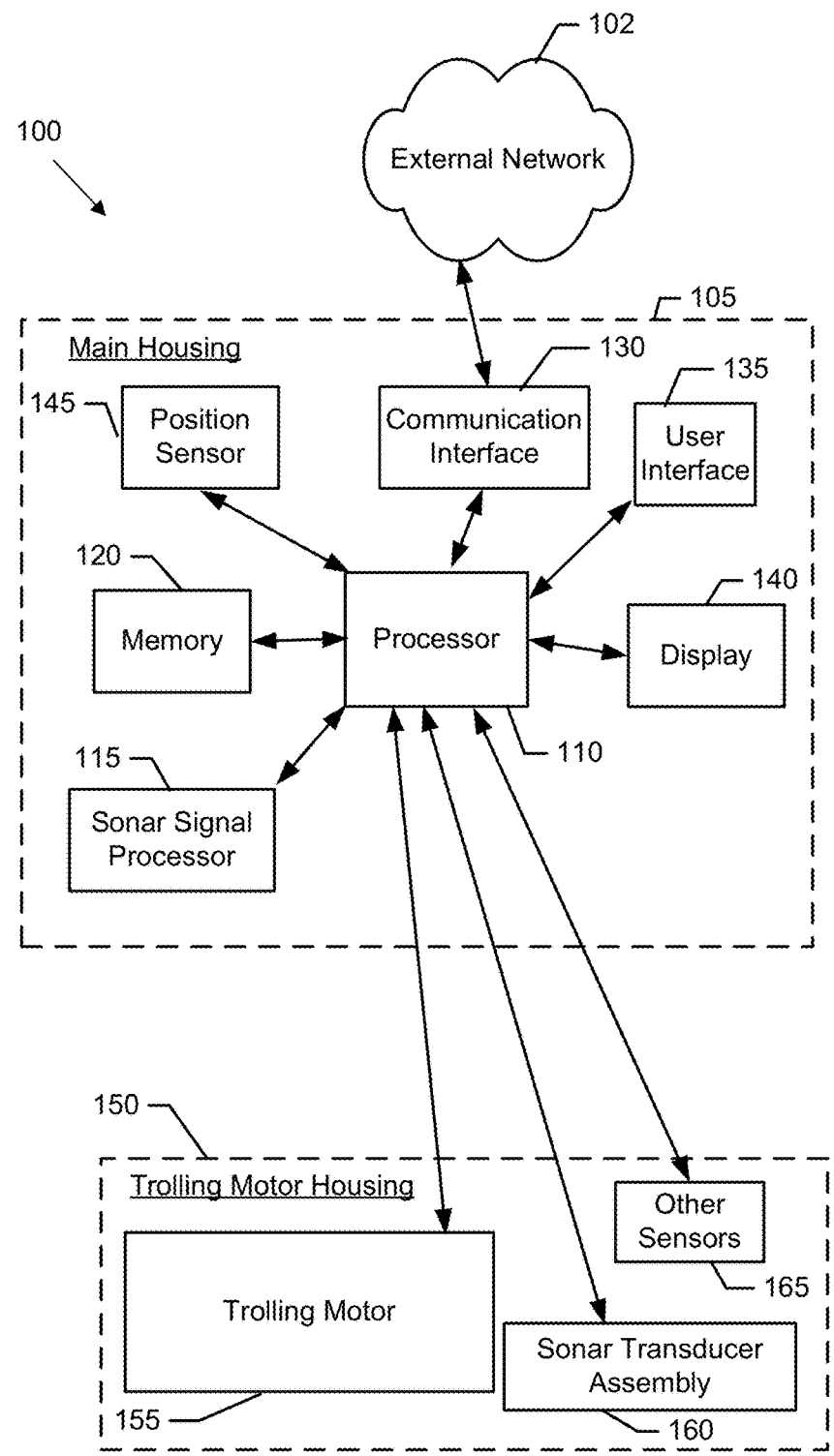
Figure 7:
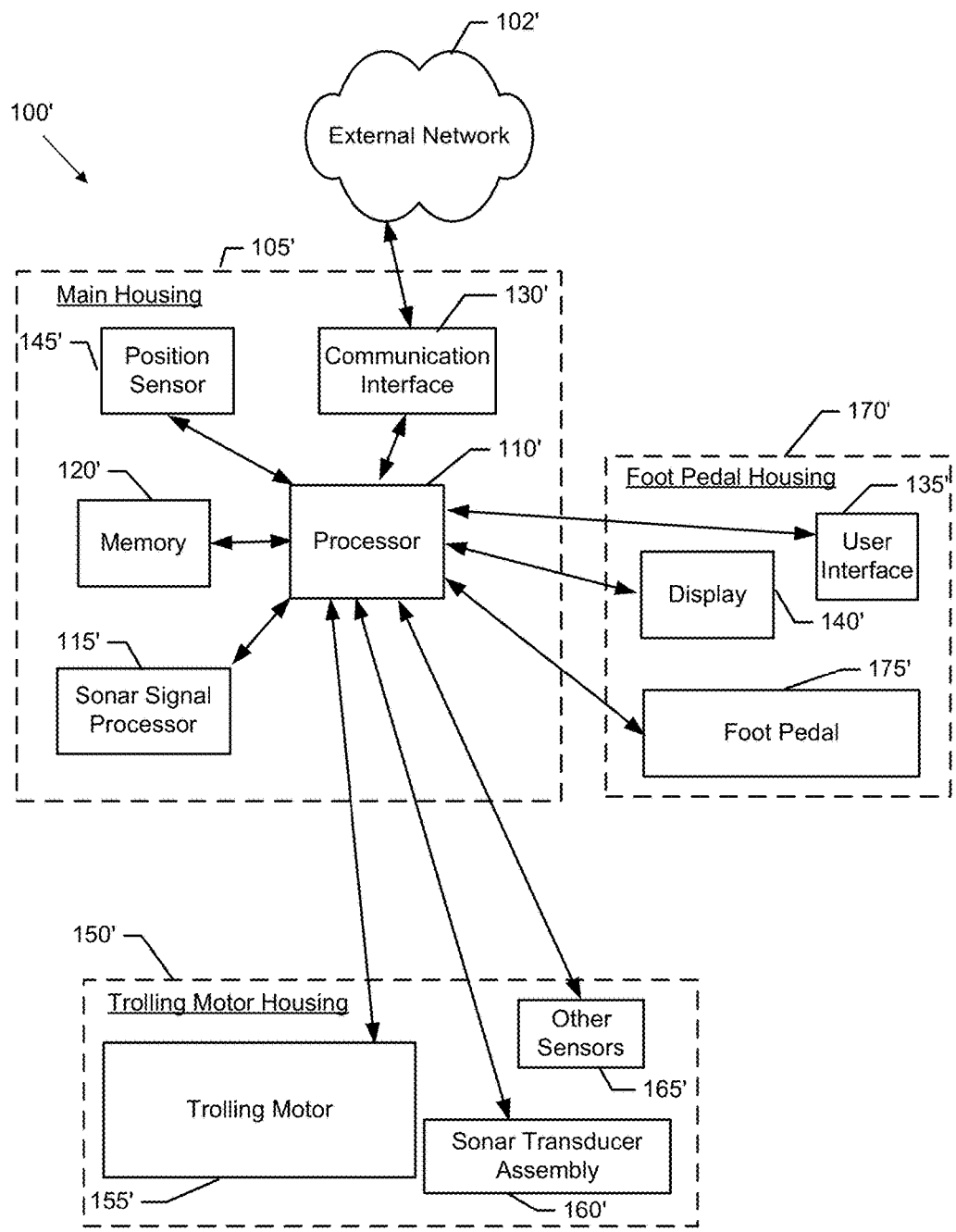
Figure 8:
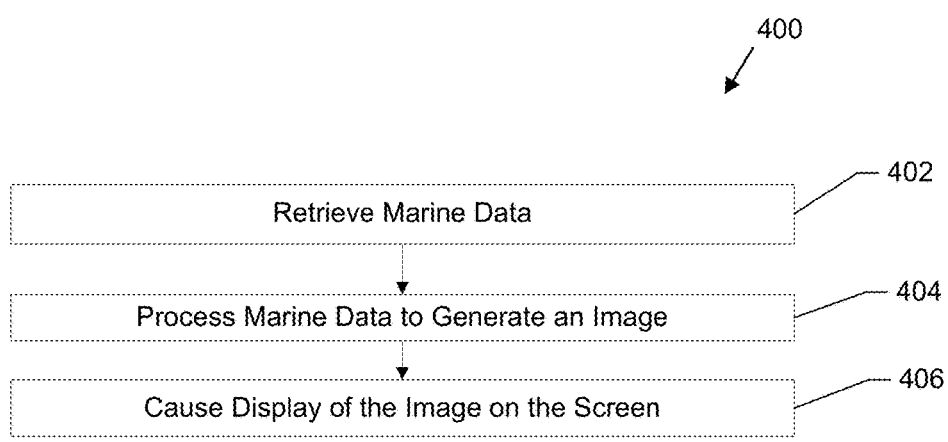
Figure 9:
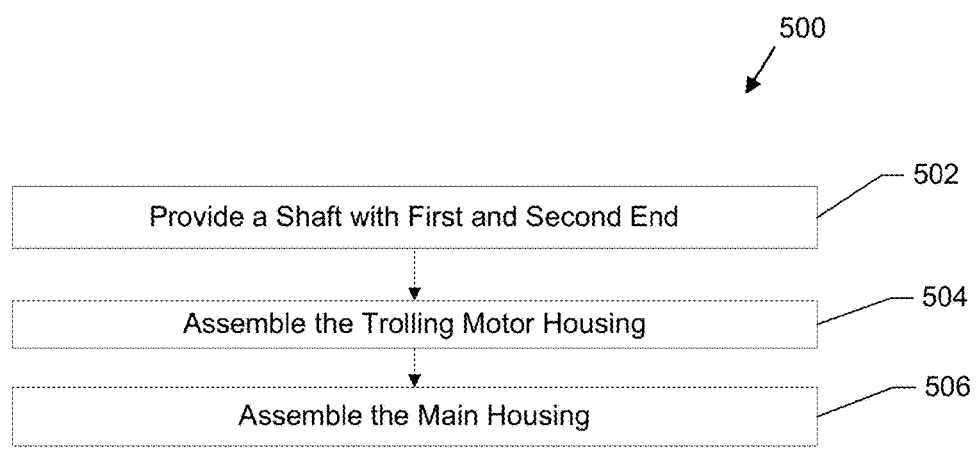

Having thus described the invention in general terms, reference will now be made to the accompanying drawings, which are not necessarily drawn to scale, and wherein:

FIG. 1 illustrates an example trolling motor assembly attached to a front of a watercraft, in accordance with some embodiments discussed herein;

FIG. 2 shows an example trolling motor assembly configured for hand-control, in accordance with some embodiments discussed herein;

FIG. 3 shows another the example trolling motor assembly that is configured for control via a foot pedal, in accordance with some embodiments discussed herein;

FIG. 4 shows an example main housing for a trolling motor assembly, wherein the screen is integrated into the main housing, in accordance with some embodiments discussed herein;

FIG. 5 shows an example foot pedal housing for a trolling motor assembly, wherein the screen is integrated into the foot pedal housing, in accordance with some embodiments discussed herein;

FIG. 6 shows a block diagram illustrating an example trolling motor assembly, in accordance with some embodiments discussed herein;

FIG. 7 shows a block diagram illustrating another example trolling motor assembly, in accordance with some embodiments discussed herein;

FIG. 8 illustrates a flowchart of an example method for processing marine data and generating an image according to some embodiments discussed herein; and FIG. 9 illustrates a flowchart of an example method of manufacturing a trolling motor assembly according to some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Embodiments of the present invention provide trolling motor assemblies with an integrated screen and/or user interface. Such example embodiments enable a user easy and quick access to useful marine data at the trolling motor. This provides advantages in space saving, equipment saving, and time saving. Indeed, a user has access to pertinent information at their current position on the watercraft without having to connect to extra external devices.

FIG. 1 illustrates an example watercraft 10 on a body of water 15. The watercraft 10 has a trolling motor assembly 20 attached to its front, with a trolling motor 50 submerged in the body of water. The trolling motor can be used as a propulsion system to cause the watercraft to travel along the surface of the water. While the depicted embodiment shows the trolling motor assembly 20 attached to the front of the watercraft 10 and as a secondary propulsion system, example embodiments described herein contemplate that the trolling motor assembly 20 may be attached in any position on the watercraft 10 and/or may be the primary propulsion system for the watercraft 10.

Depending on the design, a trolling motor may be gas-powered or electric. Moreover, steering may be accomplished manually via hand control, via foot control, or even through use of a remote control. Additionally, in some cases, an autopilot may operate the trolling motor autonomously.

FIG. 2 illustrates an example trolling motor assembly 200 that is electric and hand controlled (e.g., trolling motor assembly 100 in FIG. 6). The trolling motor assembly 200 includes a shaft 225 defining a first end 226 and a second end 227, a trolling motor housing 250 and a main housing 210.

The trolling motor housing 250 is attached to the second end 227 of the shaft 225 and at least partially contains a trolling motor that connects to a propeller 252. As shown in FIG. 1, in some embodiments, when the trolling motor assembly is attached to the watercraft and the trolling motor (or trolling motor housing) is submerged in the water, the trolling motor is configured to propel the watercraft to travel along the body of water. In addition to containing the trolling motor, the trolling motor housing may include other components described herein, including, for example, a sonar transducer assembly (160 in FIG. 6) and other sensors (165 in FIG. 6).

The main housing 210 is connected to the shaft 225 proximate the first end 226 of the shaft 225 and includes a hand control rod 218 that enables control of the trolling motor by a user (e.g., through angular rotation). As shown in FIG. 1, in some embodiments, when the trolling motor assembly is attached to the watercraft and the trolling motor (or trolling motor housing) is submerged in the water, the main housing is positioned out of the body of water and visible/accessible by a user. The main housing 210 may be configured to house components of the trolling motor assembly, such as may be used for processing marine data and/or controlling operation of the trolling motor, among other things. For example, with reference to FIG. 6, depending on the configuration and features of the trolling motor assembly, the main housing 210 may contain, for example, one or more of a processor 110, sonar signal processor 115, memory 120, position sensor 145, communication interface 130, user interface 135, or a display 140.

The trolling motor assembly 200 may also include an attachment device 228 (e.g., a clamp or other attachment means) to enable connection or attachment of the trolling motor assembly to the watercraft. Depending on the attachment device used, the trolling motor assembly may be configured for rotational movement relative to the watercraft, including, for example, 360 degree rotational movement.

FIG. 3 illustrates an example trolling motor assembly 300 that is electric and controlled with a foot pedal (e.g., trolling motor assembly 100' in FIG. 7). The trolling motor assembly 300 includes a shaft 325 defining a first end 326 and a second end 327, a trolling motor housing 350 and a main housing 310.

The trolling motor housing 350 is attached to the second end 327 of the shaft 325 and at least partially contains a trolling motor that connects to a propeller 352. As shown in FIG. 1, in some embodiments, when the trolling motor assembly is attached to the watercraft and the trolling motor (or trolling motor housing) is submerged in the water, the trolling motor is configured to propel the watercraft to travel along the body of water. In addition to containing the trolling motor, the trolling motor housing may include other components described herein, including, for example, a sonar transducer assembly (160' in FIG. 7) and other sensors (165' in FIG. 7).

The main housing 310 is connected proximate the first end 326 of the shaft 325. As shown in FIG. 1, in some embodiments, when the trolling motor assembly is attached to the watercraft and the trolling motor (or trolling motor housing) is submerged in the water, the main housing is positioned out of the body of water and visible/accessible by a user. The main housing 310 may be configured to house components of the trolling motor assembly, such as may be used for processing marine data and/or controlling operation of the trolling motor, among other things. For example, with reference to FIG. 7, depending on the configuration and features of the trolling motor assembly, the main housing 310 may contain, for example, one or more of a processor 110', sonar signal processor 115', memory 120', position sensor 145', or communication interface 130'.

The trolling motor assembly 300 also includes a foot pedal housing 370 that is electrically connected to the trolling motor (such as through the main housing 310) using the cable 372. The foot pedal housing 370 contains a foot pedal (e.g., 175' in FIG. 7) that enables a user to steer and/or otherwise operate the trolling motor to control the direction and speed of travel of the watercraft. The foot pedal housing 370 may also contain, in accordance with some embodiments, a display (140' in FIG. 7) and/or user interface (135' in FIG. 7). Further, depending on the configuration of the foot pedal, the foot pedal housing 370 (and/or main housing 310) may comprise an electrical plug 373 that can be connected to an external power source of powering the various components of the trolling motor assembly 300.

The trolling motor assembly 300 may also include an attachment device (not shown) to enable connection or attachment of the trolling motor assembly to the watercraft. Depending on the attachment device used, the trolling motor assembly may be configured for rotational movement relative to the watercraft, including, for example, 360 degree rotational movement.

As detailed herein, embodiments of the present invention provide an integrated display and/or user interface with a trolling motor assembly. In this regard, depending on the configuration, the display and/or user interface may be integrated into one or more components of the trolling motor assembly to form a single assembly that provides the user with access or visibility to many different features that are pertinent to the trolling motor and/or watercraft.

FIG. 4 illustrates an example main housing 310 for a trolling motor assembly, wherein the display and/or user interface 314 is integrated with the main housing 310. In particular, the display and/or user interface 314 is contained within the physical structure 318 of the main housing 310. In some embodiments, the display and/or user interface 314 is configured to display marine data. In the depicted embodiment, the screen of the display and/or user interface 314 is presenting sonar imagery (though images of other types of marine data can be presented—as is described herein). FIG. 6 illustrates a block diagram of an example trolling motor assembly 100 with a display 140 and user interface 135 integrated within the main housing 105.

In some embodiments, the display and/or user interface 314 may be a screen that is configured to merely present images and not receive user input. In other embodiments, the display and/or user interface 314 may be a user interface such that it is configured to receive user input in some form. For example, the screen may be a touch screen that enables touch input from a user. Additionally or alternatively, the user interface may include one or more buttons (not shown) that enable user input.

FIG. 5 illustrates an example foot pedal housing 370 for a trolling motor assembly, wherein the display and/or user interface 374 is integrated with the foot pedal housing 370. In particular, the display and/or user interface 374 is contained within the physical structure 378 of the foot pedal housing 370. In some embodiments, the display and/or user interface 374 is configured to display marine data. In the depicted embodiment, the screen of the display and/or user interface 374 is presenting sonar imagery (though images of other types of marine data can be presented—as is described herein). FIG. 7 illustrates a block diagram of an example trolling motor assembly 100' with a display 140' and user interface 135' integrated within the foot pedal housing 170'.

In some embodiments, the display and/or user interface 374 may be a screen that is configured to merely present images and not receive user input. In other embodiments, the display and/or user interface 374 may be a user interface such that it is configured to receive user input in some form. For example, the screen may be a touch screen that enables touch input from a user. Additionally or alternatively, the user interface may include one or more buttons (not shown) that enable user input.

In some embodiments, the trolling motor assembly 100, 100' may be configured to receive, process, and display various types of marine data. In some embodiments, the trolling motor assembly 100, 100' includes one or more processors 110, 110' and a memory 120, 120'. Additionally, the trolling motor assembly 100, 100' may include one or more components that are configured to gather marine data or perform marine features. In such a regard, the processor may be configured to process the marine data and generate one or more images corresponding to the marine data for display on the screen that is integrated in the trolling motor assembly. Further, the trolling motor assembly 100, 100' may be configured to communicate with various internal or external components (e.g., through the communication interface 130, 130'), such as to provide instructions related to the marine data. Though depicted as being contained in one or more of the main housing, trolling motor housing, or foot pedal housing, the various components described herein can be contained in any one of the various (or other) housings within the trolling motor assembly.

In some embodiments, the trolling motor assembly 100, 100' (see FIGS. 6 and 7) may be configured to determine the location of the watercraft, such as through position sensor 145, 145'. Accordingly, the processor (such as through execution of computer program code) may be configured to receive the marine data from the position sensor, process the marine data to generate an image including a chart with the location from the position sensor, and cause the screen to display the image. Accordingly, the display 140, 140' and/or user interface 135, 135' may be configured to display the image including the chart.

In some embodiments, the trolling motor assembly 100, 100' may comprise a navigation system that includes the position sensor 145, 145'. In such a regard, the processor (such as through execution of computer program code) may be configured to act as a navigation system. For example, the processor may generate at least one waypoint that is distinct from the location of the watercraft and, in some cases, generate an image of a chart along with the waypoint for display by the screen. Additionally or alternatively, the processor may generate one or more routes associated with the watercraft and, in some cases, generate an image of a chart along with the one or more routes. Further, additional navigation features (e.g., providing directions, weather information, etc.) are also contemplated.

In some embodiments, the trolling motor assembly 100, 100' may comprise an autopilot that is configured to operate the trolling motor to propel the watercraft in a direction and at a speed. In some embodiments, the autopilot may direct the watercraft to a waypoint (e.g., a latitude and longitude coordinate). Additionally or alternatively, the autopilot may be configured to direct the watercraft along a route, such as in conjunction with the navigation system. Further, additional autopilot features (e.g., anchoring) are also contemplated.

In some embodiments, the trolling motor assembly 100, 100' may comprise a sonar system including a sonar transducer assembly 160, 160'. The sonar transducer assembly may be housed in the trolling motor housing and configured to gather sonar data from the underwater environment relative to the watercraft. Accordingly, the processor (such as through execution of computer program code) may be configured to receive the marine data from the sonar transducer assembly, process the marine data to generate an image including a sonar image based on the gathered sonar data, and cause the screen to display the image. Accordingly, the display 140, 140' and/or user interface 135, 135' may be configured to display the image including the sonar image.

In some embodiments, the sonar system may be used to determine depth and bottom topography, detect fish, locate wreckage, etc. Sonar beams, from a sonar transducer assembly, can be transmitted into the underwater environment. The sonar signals reflect off objects in the underwater environment (e.g., fish, structure, sea floor bottom, etc.) and return to the transducer assembly, which converts the sonar returns into sonar data that can be used to produce an image of the underwater environment.

In addition to position, navigation, and sonar data, example embodiments of the present invention contemplate receipt, processing, and generation of images that include other marine data. For example, the display 140, 140' and/or user interface 135, 135' may be configured to display images associated with vessel or motor status (e.g., gauges) or other marine data.

As detailed herein, in some embodiments, the trolling motor assembly 100, 100' may include an integrated user interface that includes the screen. In such embodiments, the user interface may be configured to receive user input from a user. Likewise, the processor (such as through execution of computer program code) may be configured to receive the user input from the user interface, process the received user input to generate a modified image based on the user input, and cause the screen to display the image. In this regard, the user may be able to interact with the integrated user interface that is present at the trolling motor assembly.

In some embodiments, the trolling motor assembly 100, 100' may be configured such that the one or more processors electrically control the trolling motor in addition to the features described herein. This forms a compact and integrated system.

In some embodiments, the trolling motor assembly 100, 100' further includes a power source (e.g., a battery) that is configured to provide power to the various components of the trolling motor assembly. As such, the power source may provide power to the screen and enable electrical control of the trolling motor, thereby providing a compact and integrated system.

Though some embodiments described and/or depicted herein include the integrated display and/or user interface in the main housing with a hand control rod, some embodiments include a trolling motor assembly of any configuration where the display and/or user interface is in the main housing (including for example a trolling motor assembly with a foot pedal).

Example System Architecture

FIG. 6 shows a block diagram of an example trolling motor assembly 100 capable for use with several embodiments of the present invention. As shown, the trolling motor assembly 100 may include a number of different modules or components, each of which may comprise any device or means embodied in either hardware, software, or a combination of hardware and software configured to perform one or more corresponding functions. For example, the trolling motor assembly 100 may include a main housing 105 and a trolling motor housing 150.

The trolling motor assembly 100 may also include one or more communications modules configured to communicate with one another in any of a number of different manners including, for example, via a network. In this regard, the communication interface (e.g., 130) may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral, remote devices such as one or more wired or wireless multi-function displays may be connected to the trolling motor assembly 100.

The main housing 105 may include a processor 110, a sonar signal processor 115, a memory 120, a user interface 135, a display 140, one or more sensors (e.g., position sensor 145), and a communication interface 130.

The processor 110 (e.g., a sonar signal processor 115) may be any means configured to execute various programmed operations or instructions stored in a memory device such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 110 as described herein. In this regard, the processor 110 may be configured to analyze electrical signals communicated thereto to provide sonar data indicative of the size, location, shape, etc. of objects detected by the system 100. For example, the processor 110 may be configured to receive sonar return data and process the sonar return data to generate sonar image data for display to a user (e.g., on display 140).

In some embodiments, the processor 110 may be further configured to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other watercraft, etc.

The memory 120 may be configured to store instructions, computer program code, marine data, such as sonar data, chart data, location/position data, and other data associated with the sonar system in a non-transitory computer readable medium for use, such as by the processor.

The communication interface 130 may be configured to enable connection to external systems (e.g., an external network 102). In this manner, the processor 110 may retrieve stored data from a remote, external server via the external network 102 in addition to or as an alternative to the onboard memory 120.

The position sensor 145 may be configured to determine the current position and/or location of the main housing 105. For example, the position sensor 145 may comprise a GPS or other location detection system.

The display 140 may be configured to display images and may include or otherwise be in communication with a user interface 135 configured to receive input from a user. The display 140 may be, for example, a conventional LCD (liquid crystal display), a touch screen display, mobile device, or any other suitable display known in the art upon which images may be displayed.

In any of the embodiments, the display 140 may present one or more sets of marine data (or images generated from the one or more sets of data). Such marine data includes chart data, radar data, weather data, location data, position data, orientation data, sonar data, or any other type of information relevant to the watercraft. In some embodiments, the display may be configured to present such marine data simultaneously as in split-screen mode. In some embodiments, a user may select any of the possible combinations of the marine data for display.

The user interface 135 may include, for example, a keyboard, keypad, function keys, mouse, scrolling device, input/output ports, touch screen, or any other mechanism by which a user may interface with the system.

The trolling motor housing 150 may include a trolling motor 155, a sonar transducer assembly 160, and one or more other sensors 165 (e.g., water temperature, current, etc.), which may each be controlled through the processor 110 (such as detailed herein).

FIG. 7 shows a block diagram of an example trolling motor assembly 100' capable for use with several embodiments of the present invention. The trolling motor assembly 100' is similar to and includes many of the same components as the trolling motor assembly 100 shown in FIG. 6. Notably, however, different from the trolling motor assembly 100 of FIG. 6, the trolling motor assembly 100' of FIG. 7 further includes a foot pedal housing 170' that includes a foot pedal 175', a display 140', and a user interface 135', which may each be connected to the processor 110 (such as detailed herein). In this regard, the depicted embodiment of FIG. 7 shows that the main housing 105' does not include the display 140' or user interface 135', as it is instead in the foot pedal housing 170' (though some embodiments contemplate inclusion of the display 140' and/or user interface 135' in the main housing).

Example Flowchart(s) and Operations

Embodiments of the present invention provide methods for receiving, processing, and displaying marine data. Various examples of the operations performed in accordance with embodiments of the present invention will now be provided with reference to FIG. 8.

FIG. 8 illustrates a flowchart according to an example method for receiving, processing, and displaying marine data according to an example embodiment 400. The operations illustrated in and described with respect to FIG. 8 may, for example, be performed by, with the assistance of, and/or under the control of one or more of the processor 110/110', sonar signal processor 115/115', memory 120/120', communication interface 130/130', user interface 135/135', position sensor 145/145', display 140/140', and/or sonar transducer assembly 160/160'. Operation 402 may comprise retrieving marine data. The processor 110/110', sonar signal processor 115/115', memory 120/120', position sensor 145/145', and/or sonar transducer assembly 160/160' may, for example, provide means for performing operation 402. Operation 404 may comprise processing marine data to generate an image. The processor 110/110' and/or memory 120/120' may, for example, provide means for performing operation 404. Operation 406 may comprise causing display of the image on a screen. The processor 110/110', memory 120/192, user interface 135/135', and/or display 140/140' may, for example, provide means for performing operation 406.

FIG. 8 illustrates a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 120/120' and executed by, for example, the processor 110/110' or sonar signal processor 115/115'. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

Method of Manufacture

Embodiments of the present invention provide methods for manufacturing example trolling motor assemblies described herein. Various examples of the operations performed in accordance with embodiments of the present invention will now be provided with reference to FIG. 9.

FIG. 9 illustrates a flowchart according to an example method for manufacturing according to an example embodiment 500. Operation 502 may comprise providing a shaft with a first and second end. Operation 504 may comprise assembling the trolling motor housing to at least partially include the trolling motor. The trolling motor is configured to attach to the second end of the shaft. The trolling motor housing may include components according to any embodiments described herein. Operation 506 may comprise assembling the main housing. The main housing is configured to connect to the shaft proximate the first end. The main housing may include components according to any embodiments described herein (such as an integrated display and/or user interface). Additional embodiments contemplate methods of manufacturing according to any example trolling motor assemblies described herein, including, for example, a trolling motor assembly where the display and/or user interface is integrated with the foot pedal housing.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A trolling motor assembly configured for attachment to a watercraft, wherein the trolling motor assembly comprises:
   a shaft defining a first end and a second end;
   a trolling motor at least partially contained within a trolling motor housing, wherein the trolling motor housing is attached to the second end of the shaft, wherein, when the trolling motor assembly is attached to the watercraft and the trolling motor housing is submerged in a body of water, the trolling motor is configured to propel the watercraft to travel along the body of water;
   a main housing connected to the shaft proximate the first end of the shaft, wherein the main housing is configured to be positioned out of the body of water when the trolling motor assembly is attached to the watercraft and the trolling motor housing is submerged in the body of water;
   at least one of a position sensor configured to determine the location of the watercraft or a sonar transducer assembly configured to gather sonar data from an underwater environment relative to the watercraft;
   a screen configured to display marine data;
   one or more processors; and
   a memory including computer program code stored thereon, wherein the computer program code is configured, when executed, to cause the one or more processors to:
      receive marine data from the at least one position sensor or sonar transducer assembly;
      process the received marine data to generate an image including at least one of a chart with the location of the watercraft or a sonar image based on the gathered sonar data; and
      cause the screen to display the image,
   wherein the screen is integrated with the main housing and configured to display the image including the at least one chart or sonar image.

2. The trolling motor assembly of claim 1 further comprising a user interface including the screen, wherein the user interface is integrated with the main housing and configured to display the image and receive user input, and wherein the computer program code is further configured, when executed, to cause the one or more processors to:
   receive the user input from the user interface;
   process the received user input to generate a modified image based on the user input; and
   cause the screen to display the modified image.

3. The trolling motor assembly of claim 2, wherein the screen is a touch screen and the user input is directed to the touch screen.

4. The trolling motor assembly of claim 2, wherein the user interface defines one or more buttons integrated with the main housing.

5. The trolling motor assembly of claim 1, wherein the one or more processors and the memory are contained within the main housing.

6. The trolling motor assembly of claim 1 further comprising a navigation system that includes the at least one position sensor, and wherein the computer program code is further configured, when executed, to cause the one or more processors to:
   generate at least one of a waypoint distinct from the location of the watercraft or a route associated with the location of the watercraft; and
   cause the screen to display one or more images including the at least one waypoint or route.

7. The trolling motor assembly of claim 6 further comprising an autopilot, wherein the autopilot is configured to operate the trolling motor to propel the watercraft to the waypoint or along the route.

8. The trolling motor assembly of claim 1, wherein the at least one sonar transducer assembly is contained within the trolling motor housing and configured to gather the sonar data from at least a portion of the underwater environment around the trolling motor housing.

9. The trolling motor assembly of claim 1, wherein the computer program code is further configured, when executed, to cause the one or more processors to electrically control the trolling motor.

10. The trolling motor assembly of claim 9 further comprising a power source configured to provide power to the screen and to enable electrical control of the trolling motor.

11. A method of manufacturing a trolling motor assembly, the method comprising:
    providing a shaft defining a first end and a second end;
    assembling a trolling motor housing to at least partially contain a trolling motor, wherein the trolling motor housing is configured to attach to the second end of the shaft, wherein, when the trolling motor assembly is attached to a watercraft and the trolling motor housing is submerged in a body of water, the trolling motor is configured to propel the watercraft to travel along the body of water; and
    assembling a main housing, wherein the main housing is configured to connect to the shaft proximate the first end of the shaft, wherein the main housing is configured to be positioned out of the body of water when the trolling motor assembly is attached to the watercraft and the trolling motor housing is submerged in the body of water, wherein the main housing contains:
       at least one of a position sensor configured to determine the location of the watercraft or a sonar signal processor configured to gather sonar data from an underwater environment relative to the watercraft;
       a screen configured to display marine data;
       one or more processors; and
       a memory including computer program code stored thereon, wherein the computer program code is configured, when executed, to cause the one or more processors to:
          receive marine data from the at least one position sensor or sonar transducer assembly;
          process the received marine data to generate an image including at least one of a chart with the location of the watercraft or a sonar image based on the gathered sonar data; and
          cause the screen to display the image,
       wherein the screen is integrated with the main housing and configured to display the image including the at least one chart or sonar image.

12. The method of claim 11, wherein the main housing further contains a user interface including the screen, wherein the user interface is integrated with the main housing and configured to display the image and receive user input, and wherein the computer program code is further configured, when executed, to cause the one or more processors to:
  receive the user input from the user interface;
  process the received user input to generate a modified image based on the user input; and
  cause the screen to display the modified image.

* * * * *